Sept. 7, 1926.  
W. R. ROBINSON  
1,599,349  
ELECTROLYTICALLY FORMED HOLLOW METAL ARTICLE AND THE METHOD OF ITS MANUFACTURE  
Filed Feb. 23, 1926  
2 Sheets-Sheet 1

Inventor  
Wirt R. Robinson  
Thomas A. Jueleg Jr.  
By

Attorney

Sept. 7, 1926.   
W. R. ROBINSON   
1,599,349  
ELECTROLYTICALLY FORMED HOLLOW METAL ARTICLE AND THE  
METHOD OF ITS MANUFACTURE  
Filed Feb. 23, 1926   
2 Sheets-Sheet 2

Inventor  
Wirt R. Robinson  
By Thomas A. Jenckes Jr.  
Attorney

Patented Sept. 7, 1926.

1,599,349

UNITED STATES PATENT OFFICE.

WIRT R. ROBINSON, OF BALTIMORE, MARYLAND.

ELECTROLYTICALLY-FORMED HOLLOW-METAL ARTICLE AND THE METHOD OF ITS MANUFACTURE.

Application filed February 23, 1926. Serial No. 90,189.

My invention relates to electrolytically formed hollow metal articles, and the method of their manufacture, and particularly includes the manufacturing of said articles by electro-forming them on a fusible core. My invention particularly applies to the formation of such metal articles as spheres, cylinders, ring-shaped bodies and the like, which are commonly used as floats in sanitary flush tanks, automobile vacuum tanks, carburetors, refrigerating machinery, oil burners and so forth.

I am aware that it is old to electro-form hollow metal articles of this type by forming a fusible core in the shape of the article, electrodepositing a layer of plating metal on said core during rotation thereof in the bath and evacuating said core. My invention particularly relates to a novel method of sealing and simultaneously strengthening such parts of the articles as will be exposed to the severest stresses in actual service. In the manufacture of said articles it is necessary that an orifice be provided therein through which the core may be evacuated, whether the hollow article be of a type adapted to have no projection therefrom or whether it be of a type having a projection therefrom to which a float rod or other device may be attached, and it is to the particular sealing of said orifice which my invention relates. I am aware that hitherto nipples or plugs have been inserted at a predetermined spot on a fusible core, and have been integrally bound to the article by the plating layer itself. It has been necessary, however, to provide a hole in these nipples for the evacuation and the problem of sealing said hole has still existed. In addition it has been found practically impossible commercially to form a joint of the required strength between said nipple and one plating layer. While I am aware that glass or spun metal floats have been provided with integral necks adapted to receive the plug, so far as I am aware, I am the first to provide an electro-formed hollow metal article having a hollow substantially radial integral neck. The advantages of a neck integral with the article are as follows: The plug may be readily inserted in the neck without the use of solder. The hollow article is rendered seamless at the base of the neck at a point where it normally contacts the liquid in the apparatus in which it is used. It provides a very satisfactory means for securing the plug to the float away from contact with said liquid. In the process of its manufacture it facilitates the separation of the cathode stem from the article. It also provides means whereby a flexible tube may be readily attached to said article to facilitate a positive air test on said article prior to final assembly. As stated hitherto, where the nipple has been integrally joined to the metal article a weak joint has been present, whereas an integral neck provides strength at hitherto the weakest point of the float. It also renders possible, as will be apparent, the substitution of a threaded joint with its attendant advantages between the plug and article in place of the former soldered or electrolytic joints. Where the nipple has been attached directly to the core, it has tended to separate therefrom during rotation thereof in the bath, which danger is eliminated by providing an integral neck on said article.

A further advantage of my invention resides in the peculiar type of closure for said neck or orifice which I employ. While I am aware that various types of cast, stamped or machined plugs have hitherto been provided, so far as I am aware I am the first to provide a simple screw plug, which may be manufactured in quantities at a relatively low cost on an automatic screw machine. I preferably provide said plug with means whereby it may be screwed within said orifice. In my preferred embodiment said means comprises an annular flange on the outer end thereof. As I form the outer periphery of the threaded portion of said screw plug of approximately the diameter of the inner periphery of said neck or orifice it is obvious that as said neck is held in position by a clamp or in an automatic machine, as the screw plug is threaded therein a cooperating thread will be cut on the inner periphery of the neck to assist in binding and retaining said plug to said neck.

To form an hermetic seal over said plug and article, I similarly electrodeposit an additional layer of plating metal on the portion of the article around the neck to also reenforce the article. It is obvious that the fusible core may be used over again. It is also apparent that there is no scrap loss of metal, as the entire metal used is shaped to proper configuration.

These and such other objects of my invention as may hereinafter appear will be best understood from a description of the accompanying drawings, which illustrate various embodiments of my invention.

In the drawings:—

Figure 1:
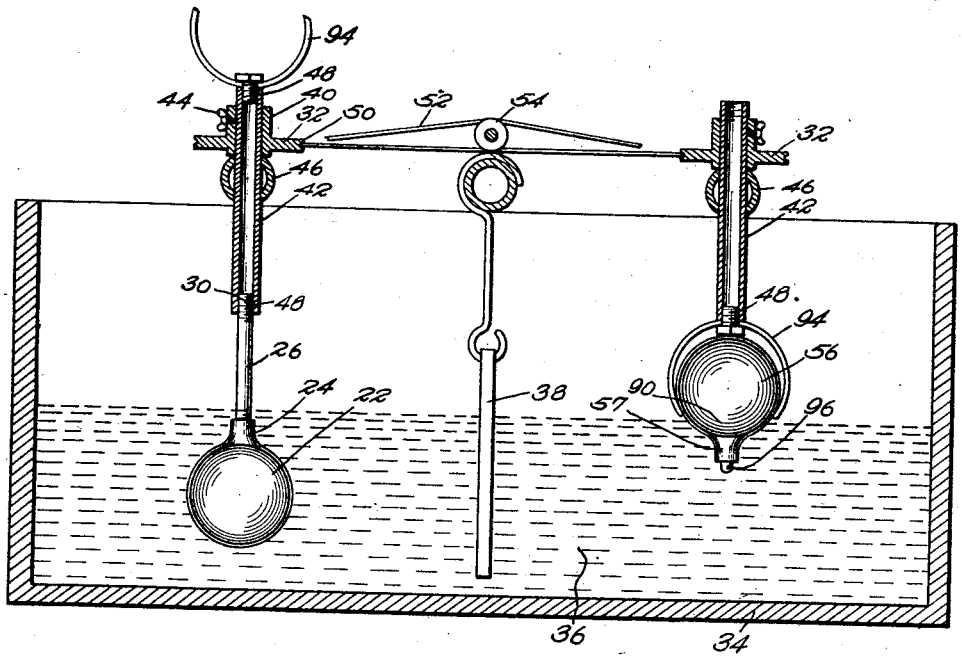
Fig. 1 is a diagrammatic view of a section of an electro-plating tank showing how the plating metal is electrodeposited to form the hollow metal articles in my process, while the core is rotated in the electroplating bath.

In the drawings, wherein like characters of reference indicate like parts throughout, 20 generally indicates a finished electro-formed hollow metal article constructed in accordance with my invention. Although I have shown a spherical float adapted particularly for use in tanks as my preferred embodiment, it is obvious that any desired shape of hollow metal article may be produced by my process such as a spheroid, taurus, etc., for use as hitherto explained. I will first describe the improved method I employ for constructing my new electro-formed hollow metal article, and I will then refer in detail to the various novel features of this structure.

Figures 2, 3, 4:
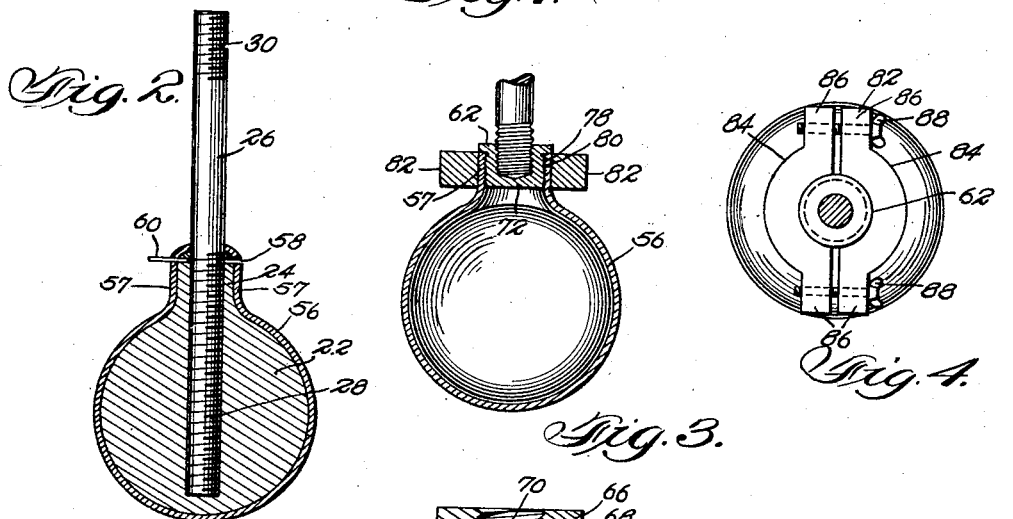
Fig. 2 is a cross-sectional view of the fusible core of my invention, having a cathode stem attached thereto, after it has been withdrawn from the plating bath with the hollow metal shell of the article plated thereon.
Fig. 3 is a cross-sectional view of the hollow metal article after the core has been evacuated therefrom in the act of having the plug threaded into the neck thereof.
Fig. 4 is a plan view of the step in the process illustrated in Figure 3 showing the hand clamp I preferably employ while threading said plug into said neck.

I first form in any well known manner preferably by means of a mold, a fusible core, 22, having the configuration of desired hollow article. I preferably form said core 22, with a substantially radial neck 24. So far as I am aware, I am the first to provide an electro-formed hollow metal article with an integral simultaneously formed neck projecting substantially radially therefrom. I then insert the cathode stem 26, within said fusible core as shown in Figure 2, said cathode stem 26 being provided with a lower irregular portion 26, whereby it may be securely retained within the core 22, during the plating operation. The cathode stem 26 also is provided with a thread 30 on the upper end thereof for securing it to the cathode sleeve 42 and pulley 32 of the electro-plating bath. After the core 22 has been formed as explained and the cathode stem 26 secured in place therein, the unit is mounted by means of the cathode stem 26 in any of the well known graphiting or conductor coating devices which renders the surface of the fusible core electrically conductive.

Figure 1 illustrates a suitable electroplating bath for use in the method of my invention which comprises a tank 34 having an electroplating solution 36 of desired strength contained therein and a suitable anode 38 suspended therein. To secure a uniform layer of plating metal on said core 22 I preferably provide means to cause a rotation of said core 22 in the bath. In my preferred embodiment said means include the pulleys 32 suitably mounted above said bath so as to revolve horizontally. Said pulleys 32 are provided with integral sleeves 40 for detachable securement to the vertical cathode sleeves 42 by means of the wing nuts 44. The cathode sleeves 42 are electrically connected with the cathode bar 46 and are provided at their ends with the interior threads 48. The outer peripheries of said pulleys 32 are provided with circumferential grooves 50 adapted to receive the rope belt 52 driven by the central shaft 54 to revolve said pulleys 32 and connected cores 22 within said bath 36. The cathode stem 26 is connected to the thread 48 on the lower end of the cathode sleeve 42 as shown in the left hand portion of Figure 1 so that the core 22 may be entirely immersed within the bath 36 and continually revolved therein until a sufficient amount of plating metal 56 has been electrodeposited thereon. It is thus obvious that the metal article 56 is at this point in the process electro-formed on the fusible core 22. The core 22 is left in the plating bath 36 until the metal shell 56 has attained the required thickness which can be readily calculated from the condition of current, temperature, etc. As soon as the layer 56 has reached the desired thickness the entire unit including the cathode stem 26, core 22 and electrodeposited hollow article 56 are removed from the bath by means of unscrewing the stem 26 from threaded connection 30 and 48 with the cathode sleeve 42. The stem 26 is now detached from the shell 56 and the core 22 removed by means of first sawing, filing or otherwise cutting an annular groove 58, as shown by means of a suitable cutting tool 60, (Fig. 2) in said article 56 near the top of the neck 57 which as is apparent, is formed on said core neck 24 integrally with said article 56 and the stem 26 is then pulled out of the core 22.

The fusible core 22 is then evacuated from within said article 56 through the neck 57 in any suitable manner, either by dissolving it out with a suitable solvent or by melting it.

Figures 5, 6:
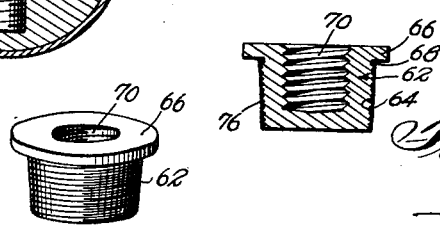
Fig. 5 is a cross-sectional view of the plug I preferably employ.
Fig. 6 is a perspective view of said plug.
Figure 7:
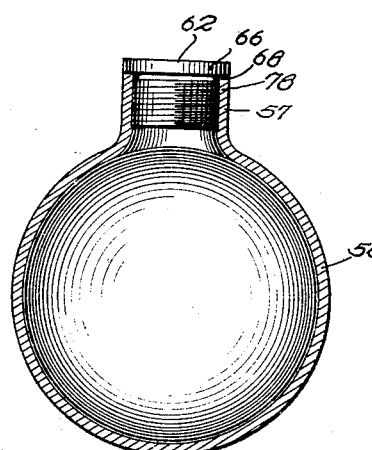
Fig. 7 is a cross-sectional view of the metal article with plug inserted, showing the inserted plug in elevation.
Figure 8:
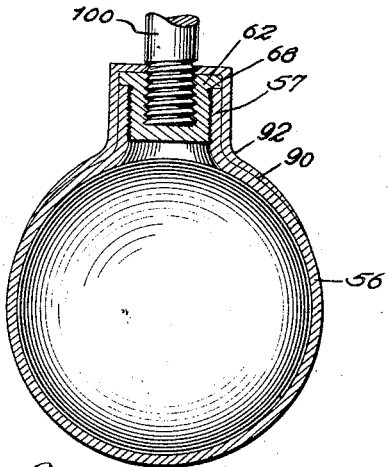
Fig. 8 is a cross-sectional view of the article with the cathode stem once more attached after the reenforcing layer of plating metal has been deposited around the portion of the article adjacent to the neck.
Figure 11:
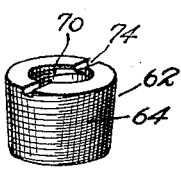
Fig. 11 is a perspective view of a modified form of plug.

I then take a suitable plug 62 preferably of a type shown in Figures 5—6 or 11 which may be readily turned out in large quantities on an automatic screw machine. The preferred embodiment of said plug 62 shown in Figures 5 and 6 has the screw thread 64 on the outer lower periphery thereof, the annular radially projecting flange 66 on the upper end thereof, and the preferably annular fillet 68 between said flange 66 and thread 64. Said plug 62 is also provided with means to receive the connecting rod therein, which in my preferred embodiment comprises the threaded axial socket 70 extending partway down said plug leaving the solid portion 72 at the base of said plug to effectually seal said hollow article. It is essential that said plug 62 be provided with some type of means whereby it may be threaded into said neck 57. Although in the preferred embodiment shown in Figures 5 and 6 said means comprises the annular flange 66, it may comprise the screw slot 74 shown in the upper end of the embodiment of plug shown in Figure 11.

The exterior of the threaded plug may then, if desired be covered with any suitable type of high temperature cement 76.

As stated, the outer periphery of the threaded portion of said plug is of approximately the diameter of the inner periphery 78 of said neck 57. I then insert the threaded plug 62 into the neck 57 of said article 56 while holding the neck 57 in any suitable manner to cut the cooperating thread 80 on the inner periphery 78 of said neck 57. While this may be done in any suitable manner either by hand or by automatic machinery, I preferably employ the cylindrical clamp 82 comprising the hemi-cylindrical portions 84 having the radial flanges 86 near the ends thereof. Said flanges 86 and integral hemi-cylinders 84 are drawn together by the medium of the wing nuts 88 to firmly press the clamp 82 around the outer periphery of said neck 57 for said thread cutting operation. When said cement 76 sets it is obvious that said plug 62 will be secured within said neck 57 not only by said cooperating threads 64 and 80 but also by said cement 76.

Figure 9:
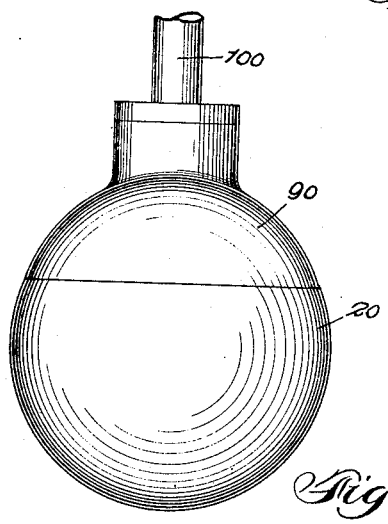
Fig. 9 is a side elevation of a completed float with a connecting rod attached.
Figure 10:
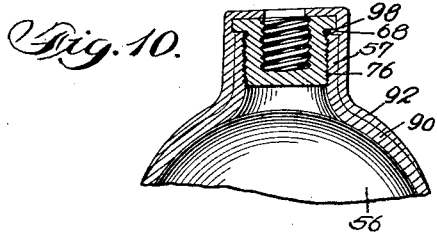
Fig. 10 is a cross-sectional view illustrating in detail the upper portion of the completed float adjacent to the neck.

To reenforce the portion of the metal article 56 around the neck and the line of jointure of the type of plug used with said article and to hermetically seal said plug to said article I preferably electrodeposit an aditional reenforcing layer 92 of plating metal on the portion 90 of said article around the neck 57. To do this, the type of bath shown in Figure 1 hitherto explained is preferably employed. The cathode sleeves 42 may be provided at one end thereof with the semicircular springs 94 adapted to clip the object 56 therein. After the neck 57 and shoulder 90 of said hollow article 56 are thoroughly cleaned by pickling, scratch-brushing, sandblasting or in any other suitable manner, the article 56 is reintroduced in an inverted position in the plating bath 36 as shown at the righthand side of Figure 1 and the spring clips 94 are clamped around the end of said article opposite from said portion 90 and neck 57 and the cathode sleeve 42 is so adjusted that the portion 90 of the article 56 adjacent to the neck 57 only will be immersed in said bath 36. If desired, a non-conducting threaded plug 96 may be inserted within the socket 70 to prevent internal plating on the threads thereof. Since this interior plating takes place extremely slowly this plug 96 may be dispensed with in most cases. The article is then left in the bath 36 and revolved as hitherto explained until a reenforcing layer 92 of the desired depth is laid thereon, the layer 92 being thus formed integral with the article 56 itself. In addition to reenforcing the article, the layer 92 effectually and hermetically seals the plug 62 within said neck 57. As shown in Figure 10 a portion 98 of said layer 92 may project within said fillet 68 to assist in binding said plug 62 to said article 56. As said article 56 is rotated, it agitates the bath 36 to a certain extent so that there is a gradual thinning or tapering effect to the outer layer 92 which renders the line of jointure of said layer to said article 56 scarely noticeable. (Fig. 9). The article 56 may then be removed from the plating bath 36 and after rinsing in water or otherwise cleaning is ready for use. If required the article 56 can be polished or buffed to any desired finish.

It is thus obvious that I have produced an electro-formed seamless hermetically sealed hollow metal article comprising an electro-hollow formed hollow body 56 having a hollow electro-formed integral neck 57 extending substantially radially outwardly therefrom, a closure 62 applied upon and secured within the outer end of said neck 57 by the cement 76, comprising the screw plug 62, the outer periphery thereof being threaded into the inner periphery 78 of said neck by the cooperating threads 64 and 80, having an annular flange 66 outside of said neck and an annular fillet 68 between said flange 66 and thread 64, and the axial socket 70 to receive a connecting rod 100 extending partway down said plug to the solid portion 72 thereof and a reenforcing layer 92 of an electrolytic metal around the portion 90 of said article adjacent to said neck 57 and over said closure 62 extending within said fillet 68 whereby said closure 62 may be secured to said article 56 by said cooperating threads 64 and 80, said cement 76 and said reenforcing plating layer 92.

While I have shown in my preferred embodiment a spherical float specifically adapted for use in tanks, and provided with a socket 70 to receive the float connecting rod 100 therein, it is obvious that my invention may be constructed in any shape such as an oblate spheroid, cylinder, taurus, etc., without departing from the spirit of my invention. It is also obvious that a float or hollow object, having a flush periphery may be constructed in accordance with my invention having a neck 57 thereof projecting radially inwardly thereof instead of outwardly, and having the outer surface of the plug 62 substantially flush with the outer periphery of said article.

Figure 12:
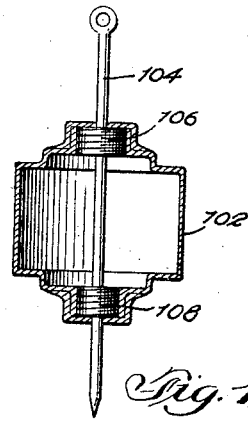
Fig. 12 is a cross-sectional view of a typical cylindrical float such as is used in the vacuum tank of an automobile.

I have illustrated in Figure 12 a typical cylindrical float 102 for use in the vacuum tank of an automobile. Said float is preferably constructed with the axial rod 104 provided with the plugs 106 and 108 secured thereto and within said cylinder 102 by my method as hitherto described.

It is obvious that I have not only provided an improved method for making seamless hollow articles of this description but that I have also provided an improved article with the advantages hereinbefore referred to.

It is understood that my invention is not limited to the specific embodiments shown or methods described and that various deviations may be made therefrom without departing from the spirit and scope of appended claims.

What I claim as new and desire to secure by Letters Patent is:—

1. The herein described improved method of manufacturing an electro-formed hollow metal article, which comprises, forming a fusible core in the shape of the article having a substantially radial neck, electrodepositing a layer of plating metal on said core during rotation thereof in the bath to form the hollow article provided with a hollow substantially radial neck on said core, evacuating said core through said hollow neck, covering the exterior of a threaded portion of a plug of approximately the diameter of the interior of the neck with cement, inserting the threaded plug into the neck while holding the neck firmly to cut a thread on the interior of the neck, and again electrodepositing a layer of plating metal on the portion of the article around the neck to reenforce the portion of the article adjacent to the neck whereby said plug may be retained within said neck by said cement, threads and final plating layer.

2. The herein described improved method of manufacturing an electro-formed hollow metal article, which comprises, forming a fusible core in the shape of the article having a substantially radial neck, electrodepositing a layer of plating metal on said core during rotation thereof in the bath to form the hollow article provided with a hollow substantially radial neck on said core, evacuating said core through said hollow neck, covering the exterior of the threaded portion of a plug of approximately the diameter of the interior of the neck with cement, inserting the threaded plug into the neck, and again electrodepositing a layer of plating metal on the portion of the article around the neck to reenforce the portion of the article adjacent to the neck whereby said plug may be retained within said neck by said cement, threads and final plating layer.

3. The herein described improved method of manufacturing an electro-formed hollow metal article, which comprises, forming a fusible core in the shape of the article having a substantially radial neck, electrodepositing a layer of plating metal on said core during rotation thereof in the bath to form the hollow article provided with a hollow substantially radial neck on said core, evacuating said core through said hollow neck, inserting a threaded plug into the neck while holding the neck firmly to cut a thread on the interior of the neck and again electrodepositing a layer of plating metal on the portion of the article around the neck to reenforce the portion of the article adjacent to the neck whereby said plug may be retained within said neck by said threads and final plating layer.

4. The herein described improved method of manufacturing an electro-formed hollow metal article, which comprises, forming a fusible core in the shape of the article having a substantially radial neck, electrodepositing a layer of plating metal on said core during rotation thereof in the bath to form the hollow article provided with a hollow substantially radial neck on said core, evacuating said core through said hollow neck, and again electrodepositing a layer of plating metal on the portion of the article around the neck to reenforce the portion of the article adjacent to the neck.

5. The herein described improved method of manufacturing an electro-formed hollow metal article, which comprises, forming a fusible core in the shape of the article having a substantially radial neck, electrodepositing a layer of plating metal on said core during rotation thereof in the bath to form the hollow article provided with a hollow substantially radial neck on said core, evacuating said core through said hollow neck, securing a plug within said neck, and again electrodepositing a layer of plating metal on the portion of the article around the neck to reenforce the portion of the article adjacent to the neck whereby said plug may be retained within said neck by said final plating layer.

6. The herein described improved method of manufacturing an electro-formed hollow metal article, which comprises, forming a fusible core in the shape of the article having a substantially radial neck, electrodepositing a layer of plating metal on said core during rotation thereof in the bath to form the hollow article provided with a hollow substantially radial neck on said core, evacuating said core through said hollow neck, covering the exterior of the threaded portion of a plug of approximately the diameter of the interior of the neck with cement, and inserting the threaded plug into the neck while holding the neck firmly to cut a thread on the interior of the neck.

7. The herein described improved method of manufacturing an electro-formed hollow metal article, which comprises, forming a fusible core in the shape of the article having a substantially radial neck, electrodepositing a layer of plating metal on said core during rotation thereof in the bath to form the hollow article provided with a hollow substantially radial neck on said core, evacuating said core through said hollow neck, and securing a plug within said neck.

8. An electro-formed seamless hermetically sealed hollow metal article comprising an electro-formed hollow body having a hollow electro-formed integral neck extending substantially radially outwards therefrom, a closure applied upon and secured within the outer end of said neck by cement, comprising a screw plug, the outer periphery thereof being threaded into the inner periphery of said neck, having an annular flange outside of said neck, an annular fillet between said flange and thread, and an axial socket to receive the float rod extending partway down said plug and a reenforcing layer of electrodeposited metal around the portion of said article adjacent to said neck and over said closure extending within said fillet whereby said closure may be secured to said article by said thread, cement and reenforcing plating layer.

9. An electro-formed seamless hermetically sealed hollow metal article comprising an electro-formed hollow body having a hollow electro-formed integral neck extending substantially radially outwards therefrom, a closure applied upon and secured within the outer end of said neck comprising a plug having an annular flange outside of said neck, an annular fillet below said flange and a reenforcing layer of electrolytic metal around the portion of said article adjacent to said neck and over said article extending within said fillet whereby said closure may be secured to said article by said reenforcing plating layer.

10. An electro-formed seamless hermetically sealed hollow metal article comprising an electro-formed hollow body having a hollow integral electro-formed neck extending substantially radially therefrom and a closure applied upon and secured within the outer end of said neck comprising a plug and a reenforcing layer of electrolytic metal around the portion of said article adjacent said neck and over said closure whereby said closure may be secured to said article by said reenforcing plating layer.

11. An electro-formed seamless hermetically sealed hollow metal article comprising an electro-formed hollow body having a hollow electro-formed integral neck extending substantially radially outwards therefrom and a closure applied upon and secured within the outer end of said neck by cement comprising a screw plug, the outer periphery thereof being threaded into the inner periphery of said neck, said plug having means thereon whereby it may be threaded into said neck, and an axial socket to receive a connecting rod extending partway down said plug and a reenforcing layer of electrolytic metal around the portion of said article adjacent to said neck and over said closure whereby said closure may be secured to said article by said thread cement and reenforcing plating layer.

In testimony whereof I affix my signature.

WIRT R. ROBINSON.